(No Model.) 2 Sheets—Sheet 1.
G. B. MARX.
STREET SWEEPER.
No. 514,658. Patented Feb. 13, 1894.
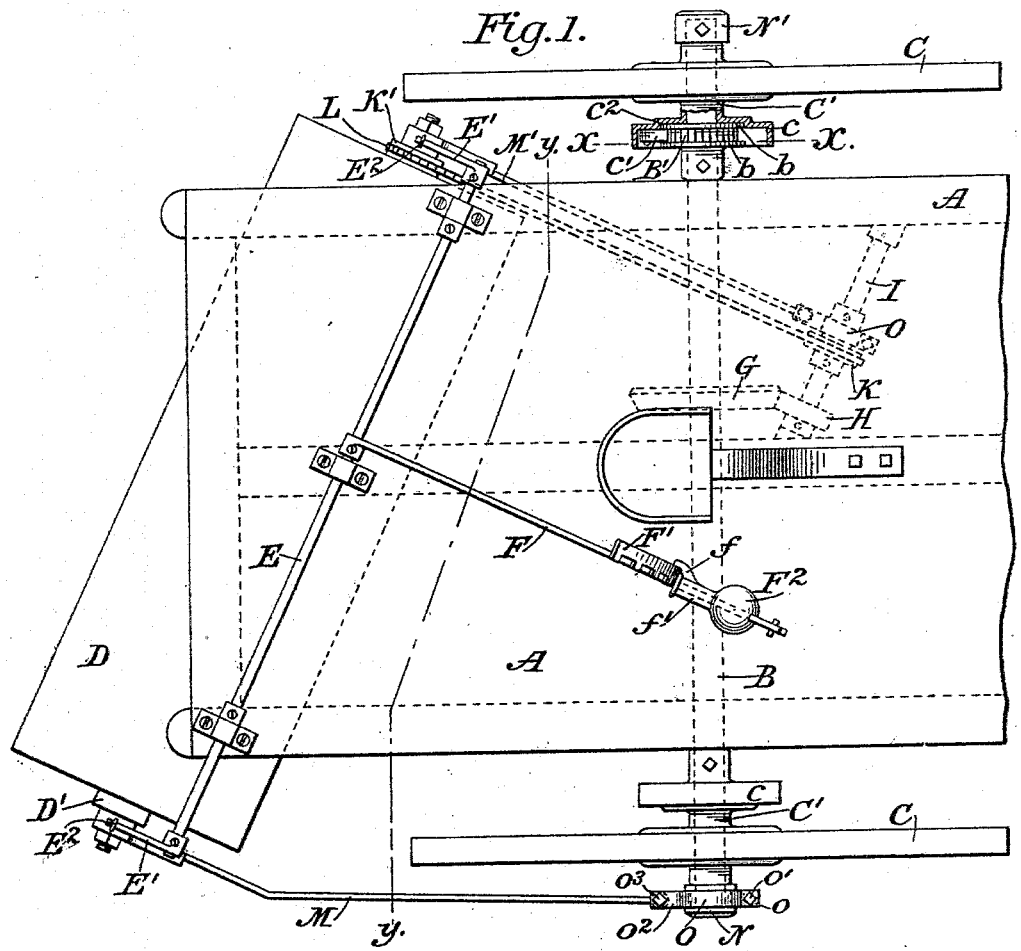
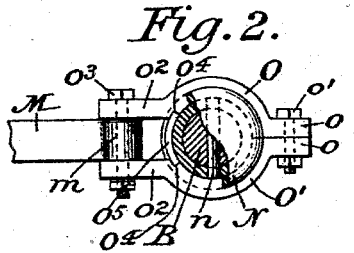
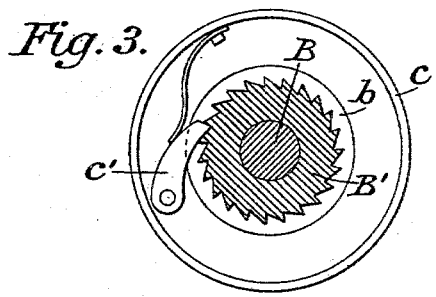
Attest:
A. N. Jesbera
A. Kidder
Inventor:
George B. Marx
by William B. Greeley
Atty.

(No Model.) 2 Sheets—Sheet 2.

G. B. MARX.
STREET SWEEPER.

No. 514,658. Patented Feb. 13, 1894.

Attest:
A. N. Jesbera
A. Kidder

Inventor:
George B. Marx
by William B. Greeley
Att'y.

UNITED STATES PATENT OFFICE.

GEORGE B. MARX, OF NEW YORK, N. Y.

STREET-SWEEPER.

SPECIFICATION forming part of Letters Patent No. 514,658, dated February 13, 1894.

Application filed October 5, 1893. Serial No. 487,229. (No model.)

*To all whom it may concern:*

Be it known that I, GEORGE B. MARX, of the city, county, and State of New York, have invented certain new and useful Improvements in Street-Sweeping Machines; and I do hereby declare that the following is a full and exact description thereof, reference being had to the accompanying drawings, and to the letters of reference marked thereon, making a part of this specification.

This invention relates to street sweeping machines of that class in which a rotating broom is supported by a truck or body and is caused to rotate by the forward movement of the truck or body, and the object is to improve the construction of such machines in various particulars whereby the efficiency and the durability thereof may be increased.

The particular features of construction wherein the invention consists will be fully described hereinafter and pointed out more particularly in the claims.

Figure 4:
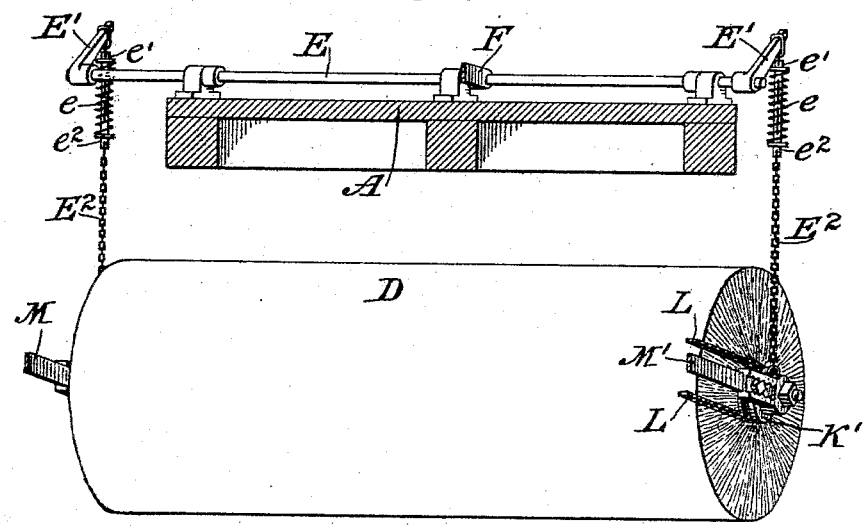
Figure 5:
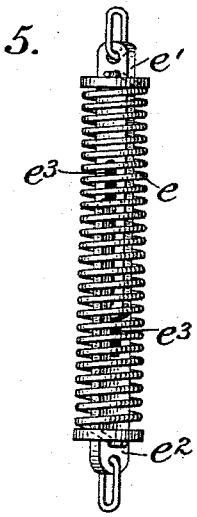

In the accompanying drawings: Figure 1 is a plan view, partly in section, showing so much of a street sweeping machine of the class referred to, as is necessary to enable my improvements to be understood. Fig. 2 is a detail view in end elevation, and partly in section, on a somewhat larger scale than that of Fig. 1, illustrating the connection between the axle of the truck and one of the links by which the broom is drawn forward. Fig. 3 is a section on the line $x$—$x$ of Fig. 1, but on a somewhat larger scale. Fig. 4 is a vertical section on the line $y$—$y$ of Fig. 1, illustrating the means for supporting the broom; and Fig. 5 is an enlarged detail elevation of the spring shown in Fig. 4.

The truck-body or platform A, the axle B, the wheels C, C, the broom D having a shaft or core D', the rock-shaft E with its arms E', E', and hand lever F for raising and lowering the broom, and the gear for driving the broom from the axle B, comprising the beveled gear G, pinion H, short shaft I, chain wheels K, K', and chain L, may be all as usual. The broom is also as usual drawn over the ground by links M, M', which are connected to the shaft or gear of the broom at one end and at the other end are connected to some part which moves with the truck or body. Usually the shorter link M' has been connected to the axle B or to the short shaft I and the longer link M to the hub of the corresponding wheel C, a yoke encircling the shaft or hub, as the case may be, and having secured to it a block to which the link is connected by a suitable joint. I have devised a simpler form of connection between the link and the part to which it is joined whereby it is possible to save some expense and weight while making the connection more durable and less likely to give out under the severe strain to which it is exposed. I have also found that I can diminish the strain upon the parts, particularly in turning and backing the machine, by connecting the longer link M to some other part rather than the hub of the wheel on that side. Accordingly, I have formed a circumferential groove, as indicated by the dotted lines in Fig. 2, in the cap N, which is fixed to the shaft or axle B by a pin $n$, and serves to hold the wheel upon the axle, it being understood that the wheels are loose upon said axle. This grooved cap is embraced by a yoke which consists of two independent parts O and O'. The yoke does not completely encircle the cap, but when the ears $o$, $o$, are brought together and secured by a bolt $o'$, the ears $o^2$, $o^2$, are separated sufficiently to receive between them the end of the link M in which an eye $m$ is formed. A bolt $o^3$ is then passed through the ears $o^2$, $o^2$, and the eye $m$, and serves both to hold the two parts of the yoke together and as a pin upon which the link $m$ is swiveled, thereby dispensing with an independent block which must be secured to the yoke and also have a swivel connection with the link. The corresponding yoke for the link M' is applied in a similar manner to the shaft I and therefore need not be more particularly referred to herein. It will be observed that as the axle does not turn when the machine is being backed or turned about, there is no wear between the yoke and the cap N and consequently less tendency to twist or bend the link M. In order to prevent the pin $n$ from working out in the space between the ears $o^2$, $o^2$, I recess the ears slightly, as at $o^4$, $o^4$, and slip in a curved filling $o^5$ which is held securely in place and closes the space between the ears completely.

The wheels C, C, as is well understood, are mounted loosely upon the axle B while the hub C' of each is provided with a flanged rim c, which bears a pawl c' for engagement with a ratchet-wheel B' fixed to the axle. The ratchet-wheel B' has heretofore been made like any other ratchet-wheel, but I have found that it is advantageous to provide it with protecting flanges b, b, particularly on the side toward the wheel, for the reason that as the wear on the side of the ratchet-wheel and the adjacent side of the flanged rim c is rapid on account of the dust which works in, the play of the wheel between the ratchet-wheel and the confining cap N or N' soon becomes considerable and the pawl does not have sufficient bearing upon the face of the ratchet-wheel. However, if a protecting rim be provided on the side of the ratchet-wheel next to the wheel C the pawl c' may be given sufficient lateral play on its pivot to compensate for the play of the wheel C, while at the same time it always has its full and proper bearing against the teeth of the ratchet-wheel. I have found that by this device I am enabled to prevent very largely the chipping of the pawl or of the teeth of the ratchet-wheel which is liable to occur when the machine is constructed as usual. I prefer to recess the side of the cover or rim c, as at $c^2$, to receive the protecting flange b, so that the pawl c' may always lie as close as possible against the rim to which it is pivoted.

Owing to the inequalities of pavements upon which machines of this description are commonly used it happens that the broom at times does not rest upon the pavement either because of some depression immediately beneath the broom or because the wheels have passed over some slight elevation. The result is that the weight of the broom is at times brought to bear suddenly upon the arms E', E', of the lifting shaft E, thereby straining and racking the mechanism for raising and lowering the broom. I have found that this difficulty may be overcome and the operation of the machine made much quieter and steadier by interposing springs e, e, in the supporting chains $E^2$, between the arms E', E', and the axle D' of the broom. I prefer also to limit the expansion of the springs and I therefore place within each spring e, two short bars e', $e^2$, which are slotted, as at $e^3$, for engagement with each other while permitting play between the two. These short bars are connected respectively to the arm E' and the upper end of the chain and have the corresponding ends of the spring e attached to them or attached with them to the chain and arm. By these means the broom is enabled to adapt itself to the inequalities of the pavement without straining the lifting mechanism.

The lever F which is fixed to the shaft E for the purpose of enabling the driver of the machine to raise and lower the broom is adapted to engage as usual with a rack F' whereby the broom may be held at any desired elevation. The lever is also provided with a counterweight $F^2$ as usual but instead of fixing the counterweight upon the lever I make it movable thereon and provide it with a finger f which is adapted to engage the rear edge of the rack F' and thereby to prevent the lever from being shaken or jarred out of engagement with the proper tooth of the rackbar. At the same time by sliding the finger and counterweight outward upon the lever F the latter may be disengaged from the rackbar. I have shown the finger f as secured to a sleeve f' which furnishes a convenient handle by which the counterweight may be moved outward. It is immaterial whether this sleeve f' be fixed to the counterweight $F^2$ or not. The weight of the sleeve or of the counterweight $F^2$ maintains the finger f always in engagement with the rear edge of the rack-bar except when it is moved out by the driver.

I claim as my invention—

1. In a street sweeping machine, the combination with a body, axle, wheels, and broom, of links connected to the axle of the broom at one end and having at their other ends a vertical eye and yokes adapted to connect said links to the body of the machine, each of said yokes being composed of the two parts O and O' having the ears o, o, and $o^2$, $o^2$, and the bolts o' and $o^3$, the ears $o^2$, $o^2$, receiving between them the end of the corresponding link, and the bolt $o^3$ passing through the eye in the end of said link, substantially as shown and described.

2. In a street sweeping machine, the combination with a body, axle, wheels and broom, of a grooved cap held by a pin upon one end of said axle outside of the corresponding wheel, a yoke embracing said cap, said yoke being composed of the two parts O and O' having the ears o, o, and $o^2$, $o^2$, and the bolts o' and $o^3$, a curved filling plate seated in recesses in the ears $o^2$, $o^2$, a link having one end held by the bolt $o^3$ between the ears $o^2$, $o^2$, and connected to one end of the broom axle, and a second link connecting the other end of the broom axle to the body of the machine, substantially as shown and described.

3. In a street sweeping machine, the combination with a body, axle, wheels, rotary broom, gearing intermediate said axle and broom to rotate the same, and means to support said broom, of ratchet-wheels secured to said axle adjacent to said wheels, each of said ratchet-wheels having a protecting flange between itself and the adjacent wheel, and a flanged rim or cover secured to the hub of each wheel, said flanged rim or cover being recessed to receive said protecting flange and having pivoted thereon a pawl for engagement with the corresponding ratchet-wheel, substantially as shown and described.

4. In a street sweeping machine, the combination with a body, axle, wheels and broom, of a rock-shaft having arms and intermediate connections for raising said broom, a hand lever fixed to said shaft, a rack-bar with which said lever may be engaged, and a counterweight adapted to slide upon said lever and having a finger to engage the rear edge of said rack-bar to prevent the disengagement of the lever from the bar, substantially as shown and described.

In testimony whereof I have signed my name to this specification in the presence of two subscribing witnesses.

GEORGE B. MARX.

Witnesses:
A. N. JESBERA,
A. WIDDER.